(12) United States Patent
Adkins (10) Patent No.: US 12,460,439 B2
(45) Date of Patent: Nov. 4, 2025

(54) TOMBSTONE AUDIO DEVICE

(71) Applicant: Hershel Adkins, West Liberty, KY (US)

(72) Inventor: Hershel Adkins, West Liberty, KY (US)

( * ) Notice: Subject to any disclaimer, the term of this patent is extended or adjusted under 35 U.S.C. 154(b) by 76 days.

(21) Appl. No.: 18/415,887

(22) Filed: Jan. 18, 2024

(65) Prior Publication Data

US 2025/0237078 A1    Jul. 24, 2025

(51) Int. Cl.
*G08B 1/08* (2006.01)
*E04H 13/00* (2006.01)
(Continued)

(52) U.S. Cl.
CPC ............ *E04H 13/001* (2013.01); *H04R 1/025* (2013.01); *H04R 1/028* (2013.01); *H04R 5/02* (2013.01); *H01M 10/465* (2013.01)

(58) Field of Classification Search
CPC ........ B23Q 7/005; B23Q 7/043; B23Q 7/046; B23Q 16/001; B23Q 1/00; B23Q 3/00; B23Q 5/00; B23Q 7/00; B23Q 9/00; B23Q 11/00; B23Q 13/00; B23Q 15/00; B23Q 16/00; B23Q 17/00; B23Q 23/00; B23Q 27/00; B23Q 33/00; B23Q 35/00; B23Q 37/00; B23Q 39/00; B23Q 41/00; B23Q 2210/00; B23Q 2220/00; B23Q 2230/00; B23Q 2240/00; B23Q 2701/00; B23Q 2703/00; B23Q 2705/00; B23Q 2707/00; B23Q 2709/00; B23Q 2716/00; B23Q 2717/00; B23Q 2727/00; B23Q 2735/00; B25J 15/0028; B25J 1/00; B25J 3/00; B25J 5/00; B25J 7/00; B25J 9/00; B25J 11/00; B25J 13/00; B25J 15/00; B25J 17/00; B25J 18/00; B25J 19/00; B25J 21/00; B65G 7/00; B65G 9/00; B65G 1/00; B65G 3/00; B65G 5/00; B65G 11/00; B65G 13/00; B65G 15/00; B65G 17/00; B65G 19/00; B65G 21/00; B65G 23/00; B65G 25/00; B65G 27/00; B65G 29/00; B65G 31/00; B65G 33/00; B65G 35/00; B65G 37/00; B65G 39/00; B65G 41/00; B65G 43/00; B65G 45/00; B65G 47/00; B65G 49/00;
(Continued)

(56) References Cited

U.S. PATENT DOCUMENTS 4,654,728 A    3/1987  Lunsford
5,401,354 A *  3/1995  Colucci .................. B25B 5/142
                                                        269/93

(Continued)

FOREIGN PATENT DOCUMENTS

EP    2284334    2/2011

*Primary Examiner* — Daniel Previl (57) ABSTRACT

A tombstone audio device for enhancing memorializing a decedent at a tombstone includes a clamp that has a first jaw which is slidably engaged to a second jaw thereby facilitating the clamp to have an adjustable width. In this way the clamp can be attached to a tombstone. An audio unit is provided and the audio unit is integrated into the clamp. The audio unit stores a pre-recorded message comprising a eulogy of the decedent associated with the tombstone. The audio unit emits the pre-recorded message when the audio unit is actuated to facilitate a visitor of the tombstone to hear the eulogy.

8 Claims, 6 Drawing Sheets

(51) Int. Cl.
*H04R 1/02* (2006.01)
*H04R 5/02* (2006.01)
*H01M 10/46* (2006.01)

(58) Field of Classification Search
CPC ........ B65G 51/00; B65G 53/00; B65G 54/00;
B65G 57/00; B65G 59/00; B65G 60/00;
B65G 61/00; B65G 63/00; B65G 65/00;
B65G 67/00; B65G 69/00; B65G
2201/00; B65G 2203/00; B65G 2205/00;
B65G 2207/00; B65G 2209/00; B65G
2249/00; B65G 2811/00; B65G 2812/00;
B65G 2813/00; B65G 2814/00; B66C
1/28; B66C 1/42; B25B 1/18; B25B 1/20;
B25B 1/24; B25B 1/2405; B25B 1/241;
B25B 1/2452; E04H 13/001; E04H
13/003; H01M 10/465; H04R 1/025;
H04R 1/028; H04R 5/02; H04R 1/00;
H04R 3/00; H04R 5/00; H04R 7/00;
H04R 9/00; H04R 11/00; H04R 13/00;
H04R 15/00; H04R 17/00; H04R 19/00;
H04R 21/00; H04R 23/00; H04R 25/00;
H04R 27/00; H04R 29/00; H04R 31/00;
H04R 2201/00; H04R 2203/00; H04R
2205/00; H04R 2207/00; H04R 2209/00;
H04R 2217/00; H04R 2225/00; H04R
2227/00; H04R 2231/00; H04R 2400/00;
H04R 2307/00; H04R 2410/00; H04R
2420/00; H04R 2430/00; H04R 2440/00;
H04R 2460/00; H04R 2499/00

USPC ... 340/692, 686.4–686.6, 825.24, 5.32, 5.84,
340/7.53, 7.51, 7.57, 7.62, 286.03,
340/286.11, 328, 815.46
See application file for complete search history.

(56) References Cited

U.S. PATENT DOCUMENTS

| | | | |
|---|---|---|---|
| D395,124 S | 6/1998 | Warren | |
| 6,296,241 B1* | 10/2001 | Harrison | B25B 5/10 |
| | | | 269/182 |
| 6,951,408 B2 | 10/2005 | Stewart | |
| 7,609,506 B2 | 10/2009 | Aguirre | |
| 2001/0036354 A1* | 11/2001 | Majors | H04N 21/4622 |
| | | | 386/346 |
| 2004/0085337 A1* | 5/2004 | Barrows | E04H 13/003 |
| | | | 715/717 |
| 2010/0008076 A1* | 1/2010 | Elam | E04H 13/003 |
| | | | 362/183 |
| 2010/0146752 A1* | 6/2010 | Dannenberg | A61G 17/04 |
| | | | 700/94 |
| 2010/0307037 A1* | 12/2010 | Chi | E04H 13/003 |
| | | | 40/124.5 |
| 2011/0067299 A1* | 3/2011 | Tilley | E04H 13/003 |
| | | | 47/41.01 |
| 2012/0052930 A1* | 3/2012 | McGucken | A63F 13/47 |
| | | | 463/1 |
| 2015/0259944 A1 | 9/2015 | McPeak | |
| 2018/0218624 A1* | 8/2018 | Osseiran | G09B 5/06 |
| 2021/0394324 A1* | 12/2021 | Stuever | B66C 1/28 |

* cited by examiner

TOMBSTONE AUDIO DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tombstone devices and more particularly pertains to a new tombstone device for enhancing memorializing a decedent at a tombstone. The device includes a clamp which includes a first jaw slidably engaged to a second jaw such that the clamp has an adjustable width to facilitate the clamp to be attached to a tombstone. The device includes an audio unit integrated into the clamp which stores a pre-recorded message comprising a eulogy of the decedent associated with the tombstone.

(2) Description of Related Art Including Information Disclosed Under 37 CFR 1.97 and 1.98

The prior art relates to tombstone devices including a variety of multimedia devices that are integrated into a tombstone for enhancing memorializing a decedent and a variety of lamp devices that each at least includes a clamp that is attachable to a tombstone and a lamp attached to the clamp for illuminating the tombstone. In no instance does the prior art disclose an audio unit which is attachable to a tombstone that includes a clamp that is attachable to the tombstone and an audio unit integrated into the clamp for emitting a pre-recorded message eulogizing a decedent.

BRIEF SUMMARY OF THE INVENTION

An embodiment of the disclosure meets the needs presented above by generally comprising a clamp that has a first jaw which is slidably engaged to a second jaw thereby facilitating the clamp to have an adjustable width. In this way the clamp can be attached to a tombstone. An audio unit is provided and the audio unit is integrated into the clamp. The audio unit stores a pre-recorded message comprising a eulogy of the decedent associated with the tombstone. The audio unit emits the pre-recorded message when the audio unit is actuated to facilitate a visitor of the tombstone to hear the eulogy.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
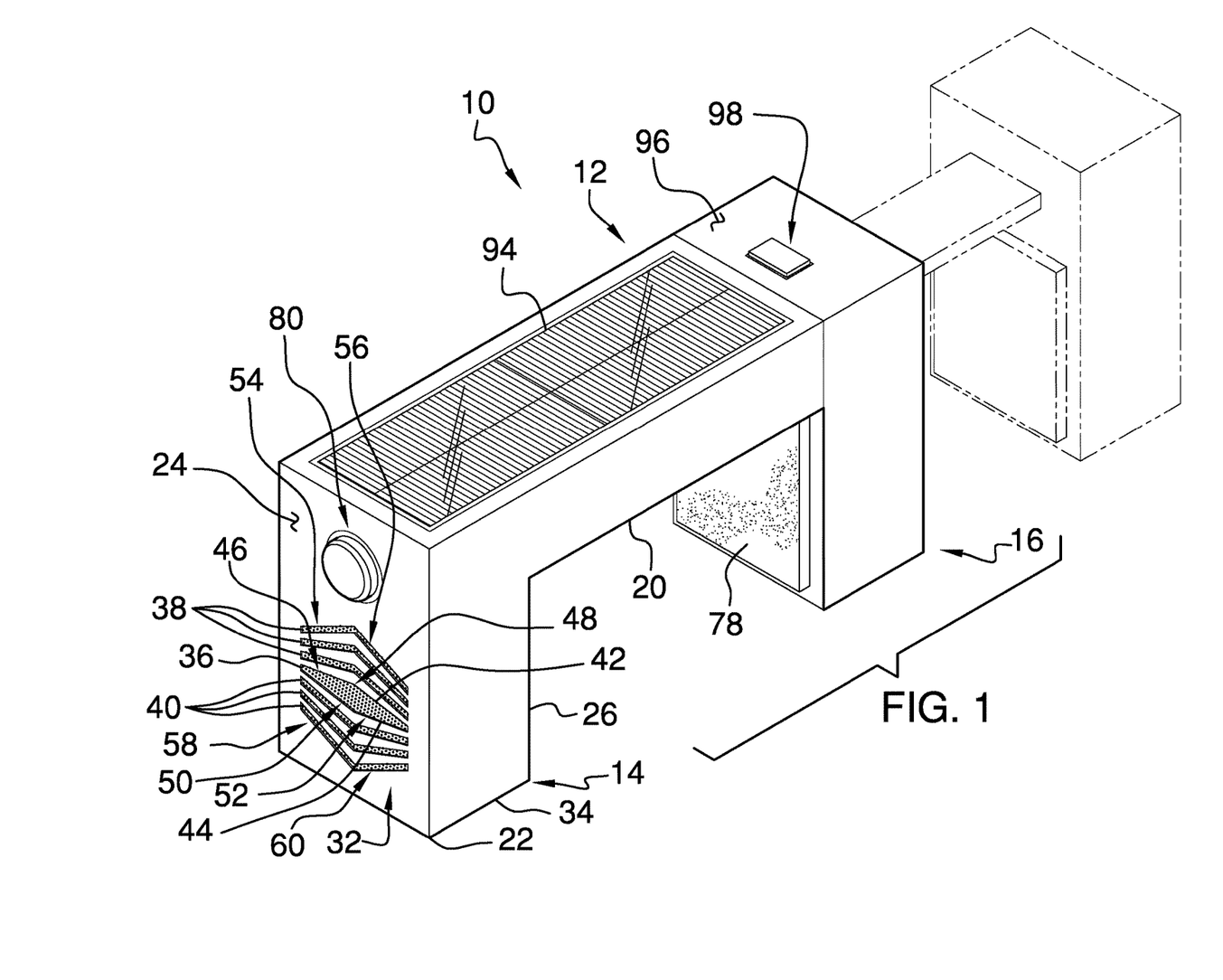
FIG. 1 is a top perspective view of a tombstone audio device according to an embodiment of the disclosure.
Figure 2:
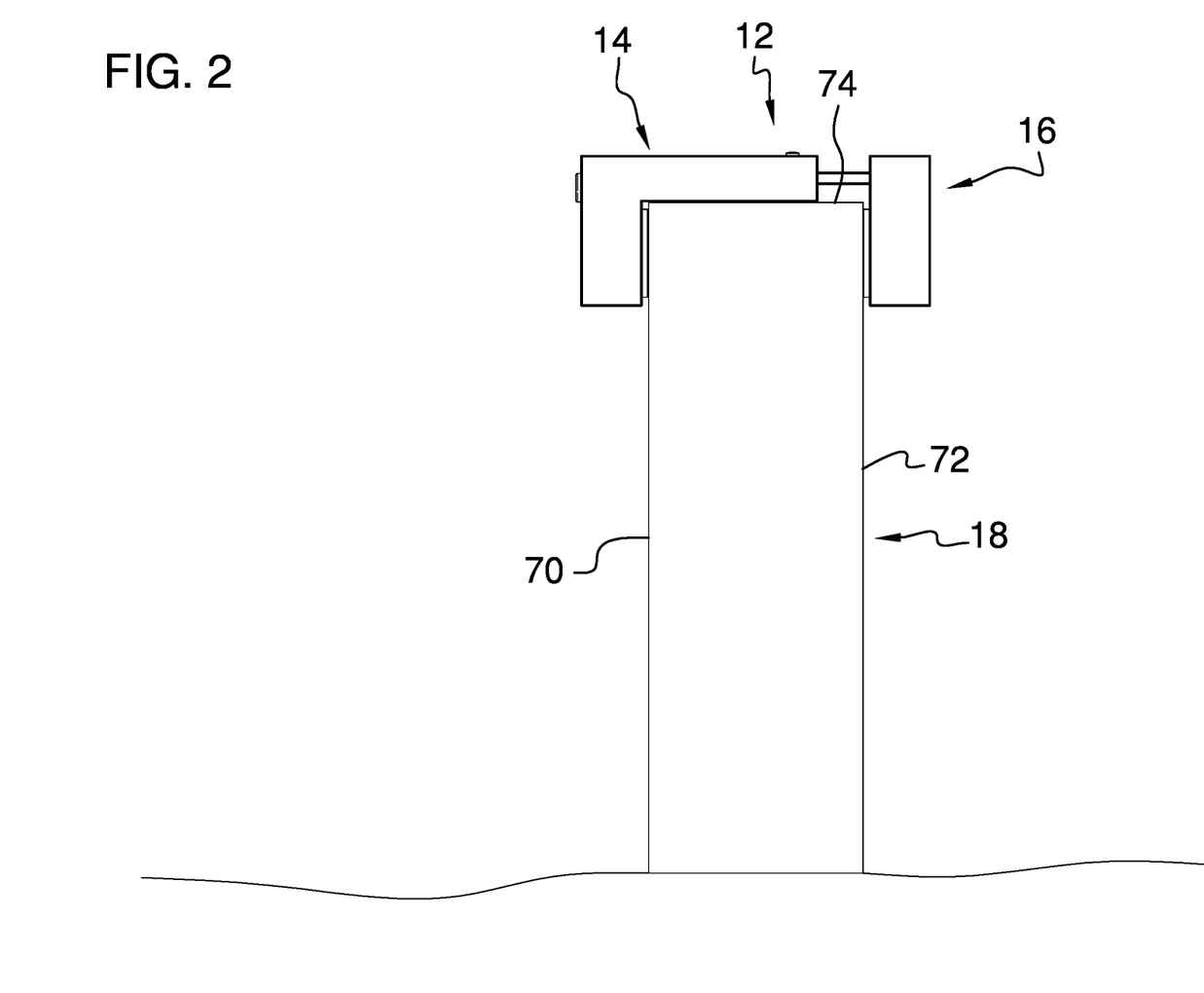
FIG. 2 is a front in-use view of an embodiment of the disclosure.
Figure 3:
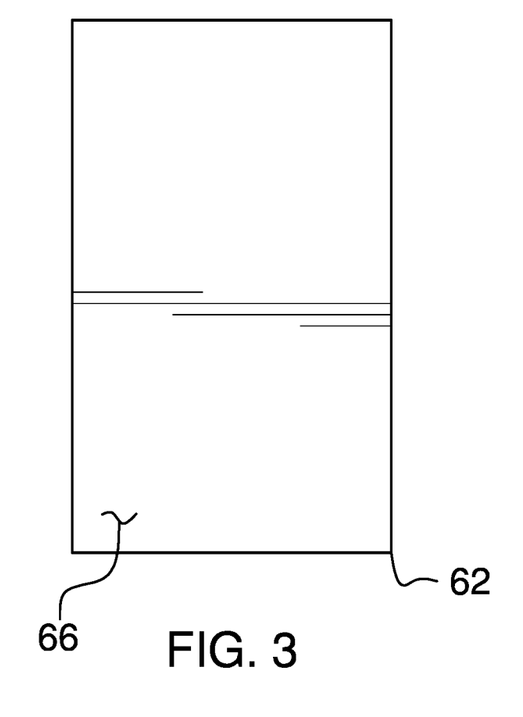
FIG. 3 is a back view of an embodiment of the disclosure.
Figure 4:
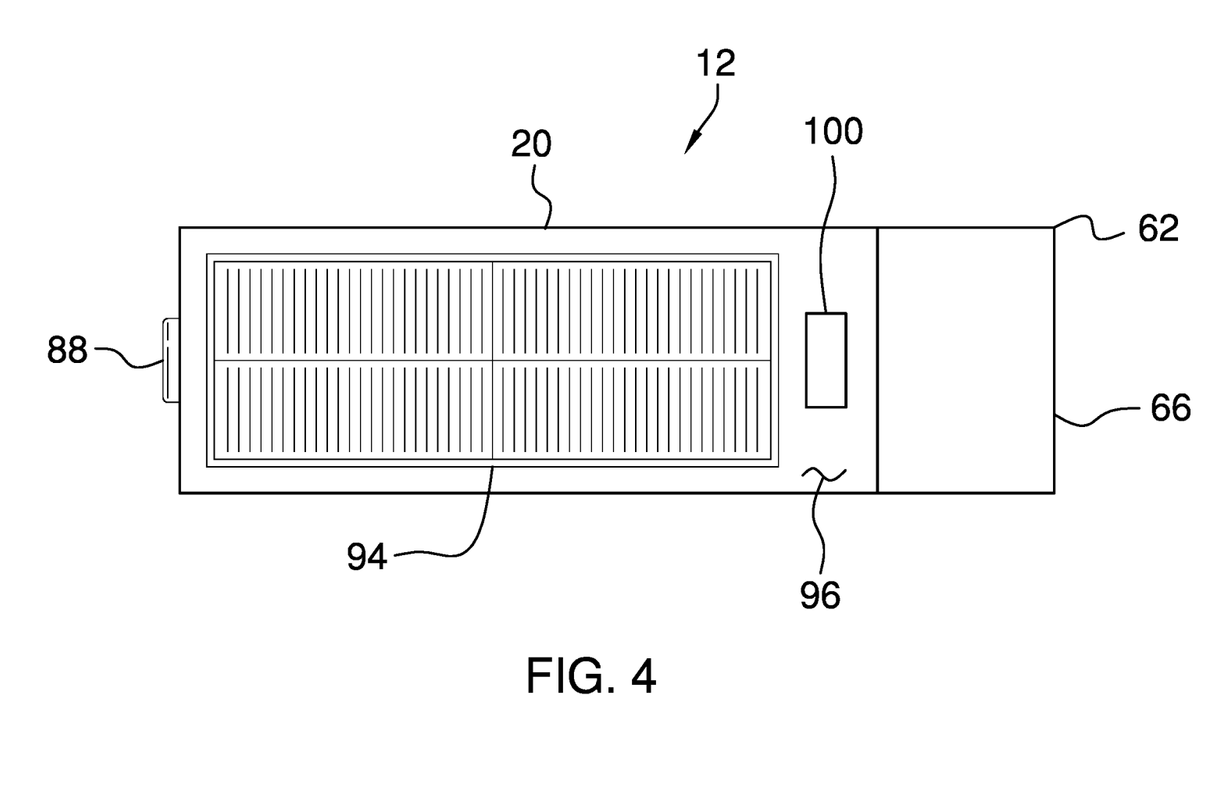
FIG. 4 is a top view of an embodiment of the disclosure.
Figure 5:
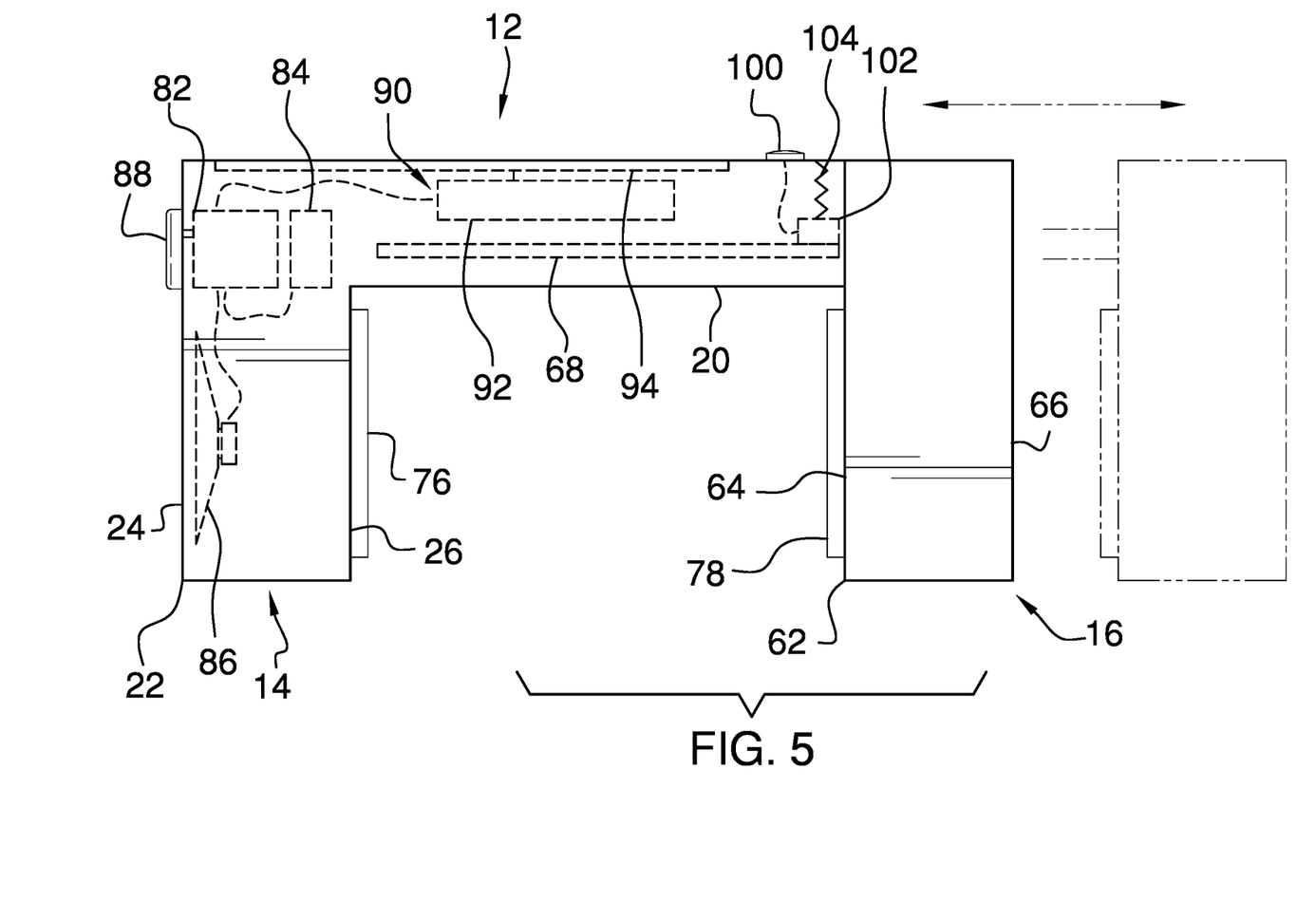
FIG. 5 is a left side phantom view of an embodiment of the disclosure.
Figure 6:
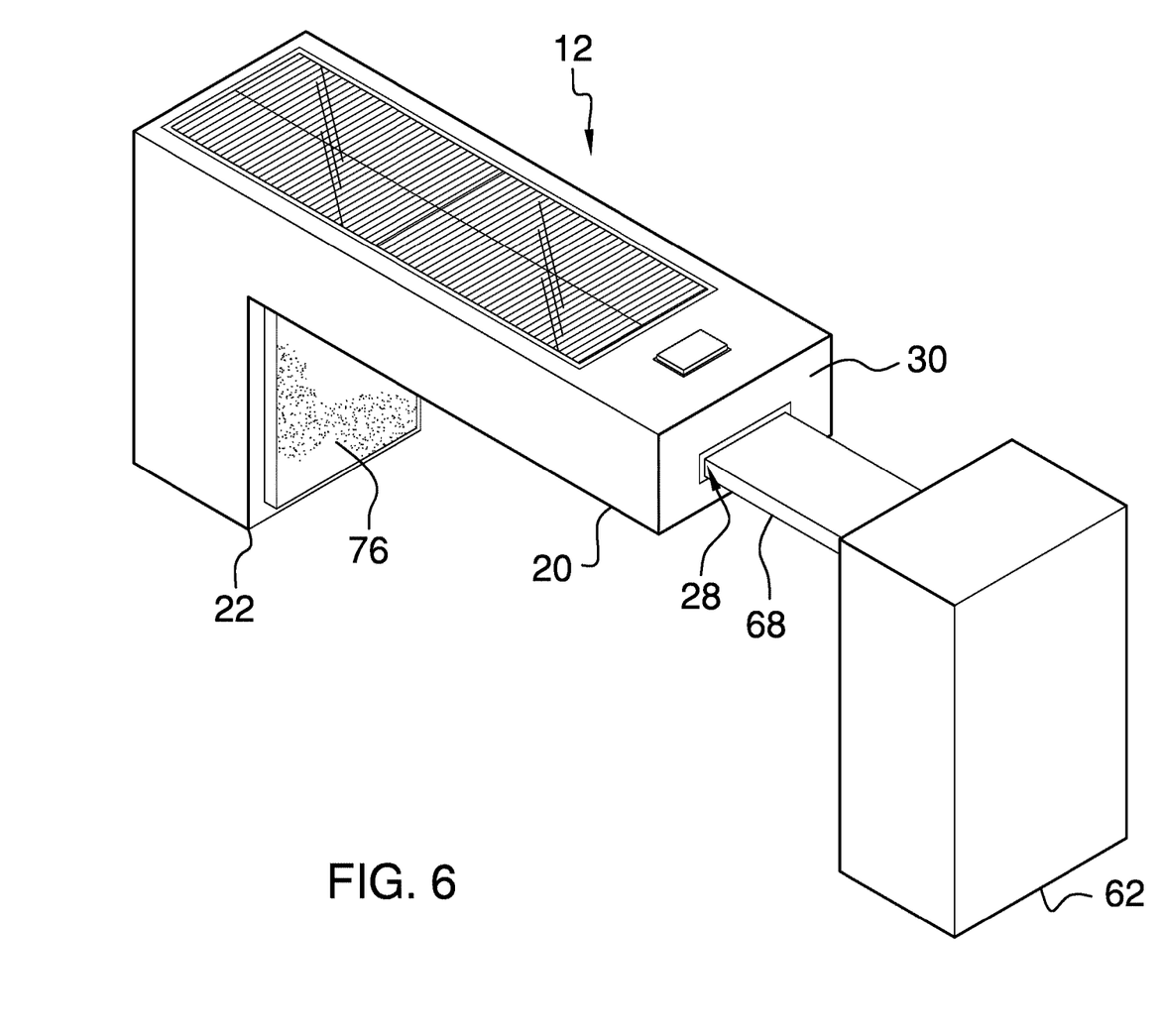
FIG. 6 is a back perspective view of an embodiment of the disclosure.

With reference now to the drawings, and in particular to FIGS. 1 through 6 thereof, a new tombstone device embodying the principles and concepts of an embodiment of the disclosure and generally designated by the reference numeral 10 will be described.

As best illustrated in FIGS. 1 through 6, the tombstone audio device 10 generally comprises a clamp 12 that has a first jaw 14 which is slidably engaged to a second jaw 16 thereby facilitating the clamp 12 to have an adjustable width. In this way the clamp 12 can be attached to a tombstone 18. The first jaw 14 comprises a leg 20 and a foot 22 extending downwardly from the leg 20; the foot 22 has a front surface 24 and a back surface 26 and each of the foot 22 and the leg 20 is substantially hollow. The leg 20 has a hole 28 extending into a distal end 30 of the leg 20 with respect to the foot 22.

The foot 22 has a plurality of slots 32 each extending through the front surface 24 of the foot 22 into an interior of the foot 22. The plurality of slots 32 is elongated to extend laterally across the front surface 24 of the foot 22 and the plurality of slots 32 is positioned closer to a bottom end 34 of the foot 22 than the leg 20. The plurality of slots 32 includes a middle slot 36 and a set of top slots 38 and a set of bottom slots 40. The middle slot 36 has a top bounding edge 42 and a bottom bounding edge 44 and the top bounding edge 42 has a first section 46 forming an angle with a second section 48. The bottom bounding edge 44 has a first section 50 which forms an angle with a second section 52 such that the middle slot 36 has a diamond shape.

Each of the plurality of top slots 38 comprises a first half 54 that is oriented at an angle with a second half 56 such that that each of the plurality of top slots 38 defines a chevron shape. Each of the first half 54 and the second half 56 of each of the plurality of top slots 38 angles downwardly toward the bottom end 34 of the foot 22. Each of the plurality of bottom slots 40 comprises a first half 58 that is oriented at an angle with a second half 60 such that that each of the plurality of bottom slots 40 defines a chevron shape. Each of the first half 58 and the second half 60 of each of the plurality of bottom slots 40 angles upwardly toward the foot 22.

The second jaw 16 comprises a panel 62 which has a forward surface 64 and a rear surface 66 and the second jaw 16 includes a stem 68 which is coupled to and extends away from the forward surface 64 of the panel 62. The stem 68 extends into the hole 28 in the distal end 30 of the leg 20 of the first jaw 14 such that the forward surface 64 of the panel 62 is directed toward the back surface 26 of the foot 22 of the first jaw 14. The panel 62 is slidable toward or away from the foot 22 thereby adjusting a distance between the panel 62 and the foot 22. In this way each of the back surface 26 of the foot 22 and the forward surface 64 of the panel 62 can abut a respective one of a front side 70 and a back side 72 of the tombstone 18 having the leg 20 of the first jaw 14 extending along a top side 74 of the tombstone 18.

A first pad 76 is coupled to the back surface 26 of the foot 22 of the first jaw 14 which abuts the front side 70 of the tombstone 18 when the clamp 12 is affixed to the tombstone 18. The first pad 76 may be comprised of a resiliently compressible material, including but not being limited to rubber or silicone, thereby facilitating the first pad 76 to grip the front side 70 of the tombstone 18. A second pad 78 is coupled to the forward surface 64 of the panel 62 of the second jaw 16 which abuts the back side 72 of the tombstone 18 when the clamp 12 is affixed to the tombstone 18. The second pad 78 may be comprised of a resiliently compressible material, including but not being limited to rubber or silicone, thereby facilitating the second pad 78 to grip the back side 72 of the tombstone 18.

An audio unit 80 is integrated into the clamp 12 and the audio unit 80 stores a pre-recorded message comprising a eulogy of the decedent associated with the tombstone 18. The audio unit 80 emits the pre-recorded message when the audio unit 80 is actuated to facilitate a visitor of the tombstone 18 to hear the eulogy. The audio unit 80 comprises a processor 82 that is positioned within the leg 20 of the first jaw 14 and the processor 82 receives an actuate input. The audio unit 80 includes an electronic memory 84 that is positioned within the leg 20 of the first jaw 14. The electronic memory 84 is electrically coupled to the processor 82 and the electronic memory 84 stores a database comprising the pre-recorded message. The pre-recorded message may have been uploaded into the electronic memory 84 at the time of manufacturing of the clamp 12 or the audio unit 80 may include a microphone that is integrated into the clamp 12 to facilitate the pre-recorded message to be recorded into the electronic memory 84.

The audio unit 80 includes a speaker 86 which is positioned within the foot 22 of the first jaw 14. The speaker 86 is aligned with the plurality of slots 32 in the front surface 24 of the foot 22 to emit audible sounds outwardly through the plurality of slots 32 when the speaker 86 is turned on. The speaker 86 is electrically coupled to the processor 82 and the speaker 86 is turned on when the processor 82 receives the actuate input. Furthermore, the speaker 86 receives the pre-recorded message stored in the electronic memory 84 for audibly emitting the pre-recorded message when the processor 82 receives the actuate input.

The audio unit 80 includes an actuate button 88 which is movably integrated into the front surface 24 of the foot 22 of the first jaw 14 such that the actuate button 88 can be manipulated by the visitor to the tombstone 18. The actuate button 88 is positioned above the plurality of slots 32 in the front surface 24 of the foot 22. The actuate button 88 is electrically coupled to the processor 82 and the processor 82 receives the actuate input when the actuate button 88 is depressed. The audio unit 80 includes a power supply 90 that is integrated into the first jaw 14 and the power supply 90 is electrically coupled to the processor 82. The power supply 90 comprises a rechargeable battery 92 which is positioned in the leg 20 of the first jaw 14 and the rechargeable battery 92 is electrically coupled to the processor 82. The power supply 90 further includes a solar panel 94 which is mounted to a top surface 96 of the leg 20 of the first jaw 14 such that the solar panel 94 is exposed to sunlight and the solar panel 94 is electrically coupled to the rechargeable battery 92 for charging the rechargeable battery 92.

A lock 98 is integrated into the leg 20 of the first jaw 14 and the lock 98 is biased into an engaging condition to engage the stem 68 of the second jaw 16 thereby inhibiting the stem 68 from sliding inwardly or outwardly from the leg 20 of the first jaw 14. The lock 98 includes a lock button 100 that is movably integrated into the top surface 96 of the leg 20 which can be depressed for actuating the lock 98 into a disengaging condition such that the lock 98 disengages the stem 68. In this way the stem 68 can freely slide into or out of the leg 20 when the lock button 100 is depressed for adjusting the width of the clamp 12. As is most clearly shown in FIG. 5, the lock 98 may include a friction pad 102 that frictionally engages the stem 68 and a biasing member 104 which biases the friction pad 102 to frictionally engage the stem 68.

In use, the clamp 12 is positioned on the top side 74 of the tombstone 18 and the lock button 100 is depressed to facilitate the first jaw 14 and the second jaw 16 to be closed against the tombstone 18. The lock button 100 is released when the first jaw 14 and second jaw 16 are closed against the tombstone 18 thereby retaining the clamp 12 on the top side 74 of the tombstone 18. The visitor to the tombstone 18 depresses the actuate button 88 to actuate the speaker 86 to emit the pre-recorded message. In this way the visitor to the tombstone 18 can listen to the pre-recorded message while the visitor mourns the decedent thereby enhancing the experience of memorializing the decedent for the visitor. Furthermore, the solar panel 94 continuously charges the rechargeable battery 92 thereby ensuring that the audio unit 80 is functional for an extended duration of time.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tombstone audio device being mountable to a tombstone for emitting an audible eulogy for the decedent associated with the tombstone, said device comprising:
   a clamp having a first jaw being slidably engaged to a second jaw thereby facilitating said clamp to have an adjustable width wherein said clamp is configured to be attached to a tombstone;
   an audio unit being integrated into said clamp, said audio unit storing a pre-recorded message comprising a eulogy of the decedent associated with the tombstone, said audio unit emitting said pre-recorded message when said audio unit is actuated wherein said audio unit is configured to facilitate a visitor of the tombstone to hear the eulogy;
   wherein said first jaw comprises a leg and a foot extending downwardly from said leg;
   wherein said foot has a front surface and a back surface;
   wherein each of said foot and said leg is substantially hollow;
   wherein said leg has a hole extending into a distal end of said leg with respect to said foot;
   wherein said foot has a plurality of slots each extending through said front surface of said foot into an interior of said foot;
   wherein said plurality of slots is elongated to extend laterally across said front surface of said foot; and
   wherein said plurality of slots is positioned closer to a bottom end of said foot than said leg.

2. The device according to claim 1, wherein:
   said plurality of slots includes a middle slot and a set of top slots and a set of bottom slots;
   said middle slot has a top bounding edge and a bottom bounding edge;
   said top bounding edge has a first section forming an angle with a second section;
   said bottom bounding edge has a first section forming an angle with a second section such that said middle slot has a diamond shape;
   each of said plurality of top slots comprises a first half being oriented at an angle with a second half such that that each of said plurality of top slots defines a chevron shape;
   each of said first half and said second half of each of said plurality of top slots angles downwardly toward said bottom end of said foot;
   each of said plurality of bottom slots comprises a first half being oriented at an angle with a second half such that that each of said plurality of bottom slots defines a chevron shape; and
   each of said first half and said second half of each of said plurality of bottom slots angles upwardly toward said foot.

3. The device according to claim 1, wherein:
   said second jaw comprises a panel having a forward surface and a rear surface;
   said second jaw includes a stem being coupled to and extending away from said forward surface of said panel;
   said stem extends into said hole in said distal end of said leg of said first jaw;
   said forward surface is directed toward said back surface of said foot of said first jaw; and
   said panel is slidable toward or away from said foot thereby adjusting a distance between said panel and said foot wherein each of said back surface of said foot and said forward surface of said panel is configured to abut a respective one of a front side and a back side of the tombstone having said leg of said first jaw extending along a top side of the tombstone.

4. The device according to claim 3, further comprising:
   a first pad being coupled to said back surface of said foot of said first jaw wherein said first pad is configured to abut the front side of the tombstone when said clamp is affixed to the tombstone; and
   a second pad being coupled to said forward surface of said panel of said second jaw wherein said second pad is configured to abut the back side of the tombstone when said clamp is affixed to the tombstone.

5. The device according to claim 1, wherein said audio unit comprises:
   a processor being positioned within said leg of said first jaw, said processor receiving an actuate input;
   an electronic memory being positioned within said leg of said first jaw, said electronic memory being electrically coupled to said processor, said electronic memory storing a database comprising the pre-recorded message; and
   a speaker being positioned within said foot of said first jaw, said speaker being aligned with said plurality of slots in said front surface of said foot wherein said speaker is configured to emit audible sounds outwardly through said plurality of slots when said speaker is turned on, said speaker being electrically coupled to said processor, said speaker being turned on when said processor receives said actuate input thereby facilitating said speaker to receive the pre-recorded message stored in said electronic memory for audibly emitting the pre-recorded message.

6. The device according to claim 5, wherein:
   said audio unit includes an actuate button being movably integrated into said front surface of said foot of said first jaw wherein said actuate button is configured to be manipulated by the visitor to the tombstone;
   said actuate button is positioned above said plurality of slots in said front surface of said foot; and
   said actuate button is electrically coupled to said processor, said processor receiving said actuate input when said actuate button is depressed.

7. The device according to claim 5, further comprising a power supply being integrated into said first jaw, said power supply being electrically coupled to said processor, said power supply comprising:
   a rechargeable battery being positioned in said leg of said first jaw, said rechargeable battery being electrically coupled to said processor; and
   a solar panel being mounted to a top surface of said leg of said first jaw wherein said solar panel is configured to be exposed to sunlight, said solar panel being electrically coupled to said rechargeable battery for charging said rechargeable battery.

8. A tombstone audio device being mountable to a tombstone for emitting an audible eulogy for the decedent associated with the tombstone, said device comprising:
   a clamp having a first jaw being slidably engaged to a second jaw thereby facilitating said clamp to have an adjustable width wherein said clamp is configured to be attached to a tombstone, said first jaw comprising a leg and a foot extending downwardly from said leg, said foot having a front surface and a back surface, each of said foot and said leg being substantially hollow, said leg having a hole extending into a distal end of said leg with respect to said foot, said foot having a plurality of slots each extending through said front surface of said foot into an interior of said foot, said plurality of slots being elongated to extend laterally across said front surface of said foot, said plurality of slots being positioned closer to a bottom end of said foot than said leg, said plurality of slots including a middle slot and a set of top slots and a set of bottom slots, said middle slot having a top bounding edge and a bottom bounding edge, said top bounding edge having a first section forming an angle with a second section, said bottom bounding edge having a first section forming an angle with a second section such that said middle slot has a diamond shape, each of said plurality of top slots comprising a first half being oriented at an angle with a second half such that that each of said plurality of top slots defines a chevron shape, each of said first half and said second half of each of said plurality of top slots angling downwardly toward said bottom end of said foot, each of said plurality of bottom slots comprising a first half being oriented at an angle with a second half such that that each of said plurality of bottom slots defines a chevron shape, each of said first half and said second half of each of said plurality of bottom slots angling upwardly toward said foot, said second jaw comprising a panel having a forward surface and a rear surface, said second jaw including a stem being coupled to and extending away from said forward surface of said panel, said stem extending into said hole in said distal end of said leg of said first jaw, said forward surface being directed toward said back surface of said foot of said first jaw, said panel being slidable toward or away from said foot thereby adjusting a distance between said panel and said foot wherein each of said back surface of said foot and said forward surface of said panel is configured to abut a respective one of a front side and a back side of the tombstone having said leg of said first jaw extending along a top side of the tombstone;

a first pad being coupled to said back surface of said foot of said first jaw wherein said first pad is configured to abut the front side of the tombstone when said clamp is affixed to the tombstone;

a second pad being coupled to said forward surface of said panel of said second jaw wherein said second pad is configured to abut the back side of the tombstone when said clamp is affixed to the tombstone; and an audio unit being integrated into said clamp, said audio unit storing a pre-recorded message comprising a eulogy of the decedent associated with the tombstone, said audio unit emitting said pre-recorded message when said audio unit is actuated wherein said audio unit is configured to facilitate a visitor of the tombstone to hear the eulogy, said audio unit comprising:

a processor being positioned within said leg of said first jaw, said processor receiving an actuate input;

an electronic memory being positioned within said leg of said first jaw, said electronic memory being electrically coupled to said processor, said electronic memory storing a database comprising the pre-recorded message;

a speaker being positioned within said foot of said first jaw, said speaker being aligned with said plurality of slots in said front surface of said foot wherein said speaker is configured to emit audible sounds outwardly through said plurality of slots when said speaker is turned on, said speaker being electrically coupled to said processor, said speaker being turned on when said processor receives said actuate input thereby facilitating said speaker to receive the pre-recorded message stored in said electronic memory for audibly emitting the pre-recorded message;

an actuate button being movably integrated into said front surface of said foot of said first jaw wherein said actuate button is configured to be manipulated by the visitor to the tombstone, said actuate button being positioned above said plurality of slots in said front surface of said foot, said actuate button being electrically coupled to said processor, said processor receiving said actuate input when said actuate button is depressed; and a power supply being integrated into said first jaw, said power supply being electrically coupled to said processor, said power supply comprising:

a rechargeable battery being positioned in said leg of said first jaw, said rechargeable battery being electrically coupled to said processor; and a solar panel being mounted to a top surface of said leg of said first jaw wherein said solar panel is configured to be exposed to sunlight, said solar panel being electrically coupled to said rechargeable battery for charging said rechargeable battery.

\* \* \* \* \*